US012755157B2

(12) United States Patent
Resnick et al.

(10) Patent No.: US 12,755,157 B2
(45) Date of Patent: Oct. 6, 2026

(54) GENERATIVE-DISCRIMINATIVE ENSEMBLE METHOD FOR PREDICTING LIFETIME VALUE

(71) Applicant: AMPERITY, INC., Seattle, WA (US)

(72) Inventors: Nicholas Resnick, New York, NY (US); Joseph Christianson, Seattle, WA (US); Joyce Gordon, Seattle, WA (US); Andrew Lim, Brooklyn, NY (US); Yan Yan, Seattle, WA (US)

(73) Assignee: AMPERITY, INC., Seattle, WA (US)

(*) Notice: Subject to any disclaimer, the term of this patent is extended or adjusted under 35 U.S.C. 154(b) by 1032 days.

(21) Appl. No.: 17/511,747

(22) Filed: Oct. 27, 2021

(65) Prior Publication Data

US 2023/0128579 A1 Apr. 27, 2023

(51) Int. Cl.

| | |
|---|---|
| ***G06N 3/088*** | (2023.01) |
| ***G06N 3/042*** | (2023.01) |
| ***G06N 3/045*** | (2023.01) |
| ***G06N 5/01*** | (2023.01) |
| ***G06Q 30/0202*** | (2023.01) |

(52) U.S. Cl.

CPC ............. *G06N 3/088* (2013.01); *G06N 3/042* (2023.01); *G06N 3/045* (2023.01); *G06N 5/01* (2023.01); *G06Q 30/0202* (2013.01)

(58) Field of Classification Search

CPC .... G06Q 30/0202; G06N 3/088; G06N 3/042; G06N 3/045; G06N 5/01; G06N 3/0475; G06N 3/084; G06N 20/20

See application file for complete search history.

(56) References Cited

U.S. PATENT DOCUMENTS

| | | | | |
|---|---|---|---|---|
| 10,262,268 B2 * | 4/2019 | Danson | G06N 5/04 | |
| 11,580,569 B2 * | 2/2023 | Yates | G06Q 20/10 | |
| 11,710,076 B2 * | 7/2023 | Kirsche | G06N 3/088 | 706/11 |
| 11,836,747 B2 * | 12/2023 | Shen | G06Q 30/0277 | |
| 11,893,507 B1 * | 2/2024 | Yan | G06N 20/00 | |
| 12,141,671 B2 * | 11/2024 | Guo | G06Q 30/0202 | |
| 2011/0029338 A1 * | 2/2011 | Kumar | G06Q 30/02 | |
| 2017/0364930 A1 * | 12/2017 | Kannan | G06Q 30/0269 | |
| 2019/0325393 A1 * | 10/2019 | Swinson | G06Q 10/10 | |
| 2022/0327408 A1 * | 10/2022 | Meng | G06N 3/088 | |
| 2023/0128579 A1 * | 4/2023 | Resnick | G06Q 30/0202 | 706/21 |
| 2023/0237386 A1 * | 7/2023 | Raut | G06F 18/2148 | 706/12 |

(Continued)

*Primary Examiner* — Dylan C White

(74) *Attorney, Agent, or Firm* — George Zalepa; Greenberg Traurig, LLP

(57) ABSTRACT

The example embodiments are directed toward predicting the lifetime value of a user using an ensemble model. In an embodiment, a system is disclosed, including a generative model for generating a first prediction representing a first lifetime value of a user during a forecasting period and a discriminative model configured for generating a second prediction representing a second lifetime value of the user during the forecasting period. The system further includes a meta-model for receiving the first prediction and the second prediction and generating a third prediction based on the first prediction and the second prediction, the third prediction representing a third lifetime value of the user during the forecasting period.

20 Claims, 5 Drawing Sheets

(56) References Cited

U.S. PATENT DOCUMENTS

| | | | | |
|---|---|---|---|---|
| 2023/0252503 | A1* | 8/2023 | Gordon | G06N 7/01 705/7.31 |
| 2024/0095603 | A1* | 3/2024 | Jadon | G06N 20/20 |
| 2024/0152782 | A1* | 5/2024 | Yan | G06N 5/04 |
| 2025/0252344 | A1* | 8/2025 | Roy | G06N 20/00 |

* cited by examiner

GENERATIVE-DISCRIMINATIVE ENSEMBLE METHOD FOR PREDICTING LIFETIME VALUE

BACKGROUND

The example embodiments are directed toward predictive modeling and, in particular, techniques for predicting a target variable such as a user lifetime value for a user using an ensemble-based machine learning approaching combining disparate models.

Currently, there are various approaches to calculating a lifetime value for a user during a forecasting period. Examples of such approaches include using generative models or discriminative models in isolation to predict the lifetime value of a user for a given forecasting period. Such individual approaches suffer from various deficiencies. For example, generative models generally rely on rigid assumptions of the underlying data set, cannot handle new features easily, and are not flexible enough to address users individually. Similarly, discriminative models generally require a holdout period that necessarily requires training the models with less data and, critically, stale data.

BRIEF SUMMARY

The example embodiments solve these and other technical problems in the art by utilizing an ensemble approach to modeling user lifetime value. In the example embodiments, both generative models and discriminative models are used to individually predict a user lifetime value. Then, a meta-model is trained to weigh the outputs of the generative models and discriminative models to obtain a more accurate prediction of the lifetime value of a given user. In some embodiments, a feature-weighting is further applied by the meta-model to adjust the importance of the generative models and discriminative models based on the underlying input features.

In the various embodiments, generative models can be utilized to maximize the amount of training data used to predict a lifetime value of a customer since such models (unlike discriminative models) do not require a holdout period of data. Indeed, generative models can frequently be used by themselves to reasonably predict the lifetime value of a customer. However, generative frequently do not account for personalized behaviors of individual customers, emphasizing predictions in aggregate on a community of users. Some attempts to counteract this deficiency involve modifying training data to account for per-user preferences. However, such approaches still suffer from the underlying model deficiencies. While generative models do provide reasonable accuracy, there are still significant deviations between predicted outputs and actual outputs.

On the other hand, discriminative models generally provide improved per-user prediction accuracy since such models generally account for per-user features during training and are often much more complex than generative models. However, discriminative models explicitly rely on holdout data to validate model performance. As a result, discriminative models cannot technically be trained on the latest training data since the latest data is generally reserved for validation. Currently, no system for predicting customer lifetime model has combined these two approaches to improve prediction accuracy. Specifically, the use of a generative model to capture all training data combined with a discriminative model to improve per-user accuracy (with, in some embodiments, feature weighting) provides a significant boost in prediction accuracy while maximizing the use of training data in a way not currently performed for customer lifetime value prediction.

In an embodiment, a system is disclosed that includes a generative model, discriminative model, and meta-model. In this embodiment, the generative model can generate a first prediction representing a first lifetime value of a user during a forecasting period, while the discriminative model can generate a second prediction representing a second lifetime value of the user during the forecasting period. Then, the meta-model can be configured to receive the first prediction and the second prediction and generate a third prediction based on the first and second predictions. The resulting third prediction represents a third lifetime value of the user during the forecasting period. In some embodiments, multiple generative, discriminative, and meta-models can be used.

In some embodiments, the generative model can include a Pareto negative binomial distribution model with an optional gamma-gamma model. In some embodiments, the discriminative model can include a linear regression model or a random forest model. In some embodiments, the meta-model can be trained and represented as a plurality of weighting coefficients or a weight matrix and a plurality of functions.

In some embodiments, generating the third prediction can include weighting the first prediction and the second prediction by a first weight and a second weight, respectively, to generate a first weighted prediction and a second weighted prediction. In some embodiments, generating the third prediction can include multiplying the first prediction by a weighted feature selected by the meta-model to generate a first weighted prediction and multiplying the second weighted prediction by the feature selected by the meta-model to generate a second weighted prediction. In some embodiments, generating the third prediction can include summing the first weighted prediction and the second weighted prediction to generate a sum and using the sum as the third prediction.

In other embodiments, a method is disclosed that includes generating a first prediction representing a first lifetime value of a user during a forecasting period using a generative model and generating a second prediction representing a second lifetime value of the user during the forecasting period using a discriminative model. The method can then include receiving the first prediction and the second prediction via a meta-model and generating a third prediction based on the first prediction and the second prediction using the meta-model, the third prediction representing a third lifetime value of the user during the forecasting period.

In an embodiment, the generative model can include a Pareto negative binomial distribution model with an optional gamma-gamma model. In an embodiment, the discriminative model can include one or more of a linear regression model or a random forest model. In an embodiment, the meta-model can include a plurality of weighting coefficients or a weight matrix and a plurality of functions. In an embodiment, generating the third prediction can include weighting the first prediction and the second prediction by a first weight and a second weight, respectively, to generate a first weighted prediction and a second weighted prediction. In an embodiment, generating the third prediction can include multiplying the first prediction by a weighted feature selected by the meta-model to generate a first weighted feature and multiplying the second weighted prediction by the feature selected by the meta-model to generate a second weighted feature. In an embodiment, generating the third prediction can include summing the first weighted feature and the second weighted feature to generate a sum and using the sum as the third prediction.

In other embodiments, a non-transitory computer-readable storage medium for tangibly storing computer program instructions capable of being executed by a computer processor is disclosed. In this embodiment, the computer program instructions can define the steps of generating a first prediction representing a first lifetime value of a user during a forecasting period using a generative model and generating a second prediction representing a second lifetime value of the user during the forecasting period using a discriminative model. The computer program instructions can then include receiving the first prediction and the second prediction via a meta-model and generating a third prediction based on the first prediction and the second prediction using the meta-model, the third prediction representing a third lifetime value of the user during the forecasting period.

In an embodiment, the generative model used by the computer program instructions can include a Pareto negative binomial distribution model with an optional gamma-gamma model. In an embodiment, the discriminative model used by the computer program instructions can include one or more of a linear regression model or a random forest model. In an embodiment, the meta-model used by the computer program instructions can include a plurality of weighting coefficients or a weight matrix and a plurality of functions. In an embodiment, the computer program instructions for generating the third prediction can include weighting the first prediction and the second prediction by a first weight and a second weight, respectively, to generate a first weighted prediction and a second weighted prediction. In an embodiment, the computer program instructions for generating the third prediction can include multiplying the first prediction by a weighted feature selected by the meta-model to generate a first weighted feature and multiplying the second weighted prediction by the feature selected by the meta-model to generate a second weighted feature. In an embodiment, the computer program instructions for generating the third prediction can include summing the first weighted feature and the second weighted feature to generate a sum and using the sum as the third prediction.

DETAILED DESCRIPTION

The example embodiments describe systems, devices, methods, and computer-readable media for predicting the lifetime value of a user using a stacking ensemble model.

Figure 1:
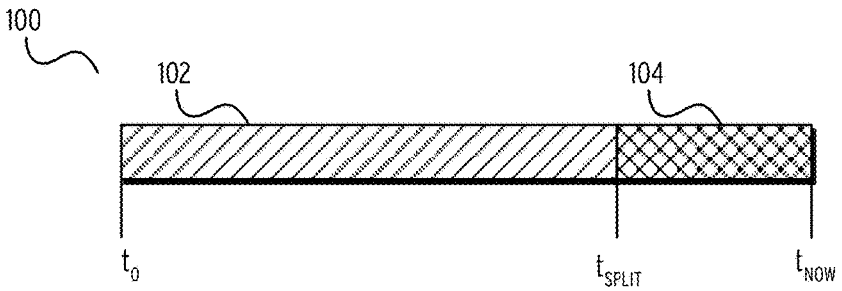
FIG. 1 is a graph illustrating a data set according to some of the example embodiments.

FIG. 1 is a graph illustrating a data set according to some of the example embodiments.

In the illustrated embodiment, data 100 is amassed from an inception point ($t_0$) up to the current time ($t_{now}$). In some embodiments, the value of $t_0$ can comprise the date of the first recorded interaction by a system. In other embodiments, if the data 100 is per-user, the value of $t_0$ can comprise the date of the first recorded interaction of a given user. In other embodiments, $t_0$ can comprise an arbitrary date (e.g., the date a meta-model was last trained).

The data 100 can comprise recorded interactions of all users of a system or of a single user. In some embodiments, the data 100 can comprise a set of columns or other fields that represent captured metrics. For example, in an embodiment, the data 100 can comprise a user identifier, interaction date, interaction price, etc. As one example, data 100 can comprise a purchase history for one or more users. In some embodiments, the data 100 can comprise raw data that is stored in one or more databases such as relational databases, NoSQL databases, or other storage media. In other embodiments, the data 100 can comprise engineered data In the illustrated embodiment, the data 100 can be split logically into a training set 102 and a test set 104. In some embodiments, this split is denoted by split time ($t_{split}$). In some embodiments, the split time can be determined based on the needs of a downstream model. Specifically, in an embodiment, the test set 104 can be sized to support the testing of a discriminative model. As one example, the difference between $t_{now}$ and $t_{split}$ can be one month, although the specific period is not limiting. In some embodiments, the training set 102 can comprise all data between $t_0$ and $t_{split}$. In some embodiments, the value of $t_0$ can vary per-user. In some embodiments, the value of $t_0$ can comprise the date of the first recorded interaction of a given user. In other embodiments, the value of $t_0$ can comprise a date after the date of the first recorded interaction. In some embodiments, the value of $t_0$ can be selected by computing a date a fixed distance in the past from $t_{split}$. For example, the value of $t_0$ can be determined by calculating a date one month prior to $t_{split}$. As discussed, the value of $t_{split}$ itself can be computed by selecting a date a fixed distance from the current time and thus both $t_0$ and $t_{split}$ can be calculated from the current date.

As will be discussed next, some models can use all data 100 when training. Other models, however, may only use training set 102 while training and may reserve the test set 104 for testing and validation of a trained model.

Figure 2:
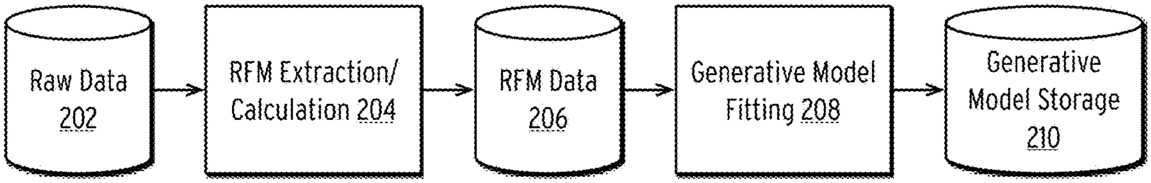
FIG. 2 is a block diagram illustrating a system for training a generative model according to some of the example embodiments.

FIG. 2 is a block diagram illustrating a system for training a generative model according to some of the example embodiments.

In the illustrated embodiment, a database 202 stores raw data. As discussed in FIG. 1, the raw data can include user data and interactions of those users with objects managed or stored by a system. As one example, the raw data can include transaction data of users in an e-commerce system. In such an example, the transaction data can comprise transactions associated with users, where each item of transaction data includes a transaction date, a transaction amount, product information, etc.

In one embodiment, the system can pre-process data to generate data suitable for fitting a generative model. In an embodiment, the system can process raw data to extract recency, frequency, and monetary (RFM) data for each user. In such an embodiment, an RFM extraction or calculation module 204 can generate RFM data for each user. Then, a given user and associated RFM values can be written to database 206 and used for subsequent fitting. In an embodiment, recency data for a user can comprise a time between the first and the last interaction recorded in database 202. In an embodiment, frequency data can include a number of interactions beyond an initial interaction. In an embodiment, monetary data can comprise an arithmetic mean of a user's interaction value (e.g., price). In some embodiments, each of the RFM values can be calculated for a preset period (e.g., the last year). In some embodiments, the RFM values can include additional features such as a time value which represents the time between the first interaction and the end of a preset period.

In the illustrated embodiment, a generative model fitting phase 208 ingests the data (e.g., RFM data) from database 206 and fits a generative model. In an embodiment, the generative model can include any statistical model of a joint probability distribution reflecting a lifetime value of a user for a given forecasting period. In an embodiment, the generative model can comprise a Pareto negative binomial distribution model (NBD) model. In some embodiments, the Pareto/NBD model can further include a gamma-gamma model or other extension. Other models, such as a beta geometric (BG)/NBD, can also be used. In some embodiments, existing libraries can be used to fit a generative model using the data (e.g., RFM data) and the details of fitting a generative model are not recited in detail herein.

After fitting, the generative model fitting phase 208 outputs the model parameters to a storage device 210. In some embodiments, the storage device 210 can comprise a database, while other formats (e.g., serialized flat files, in-memory storage) can be used. In some embodiments, the generative model fitting phase 208 outputs a small number of parameters (e.g., seven parameters for a Pareto/NBD model with a gamma-gamma extension) and thus the generative model fitting phase 208 can write these parameters to a flat file (e.g., a Pickle-formatted file in using the Python programming language) or another non-relational storage device. In some embodiments, the system can execute entirely or partially in memory and the model parameters can be calculated on demand for downstream usage.

Figure 3:
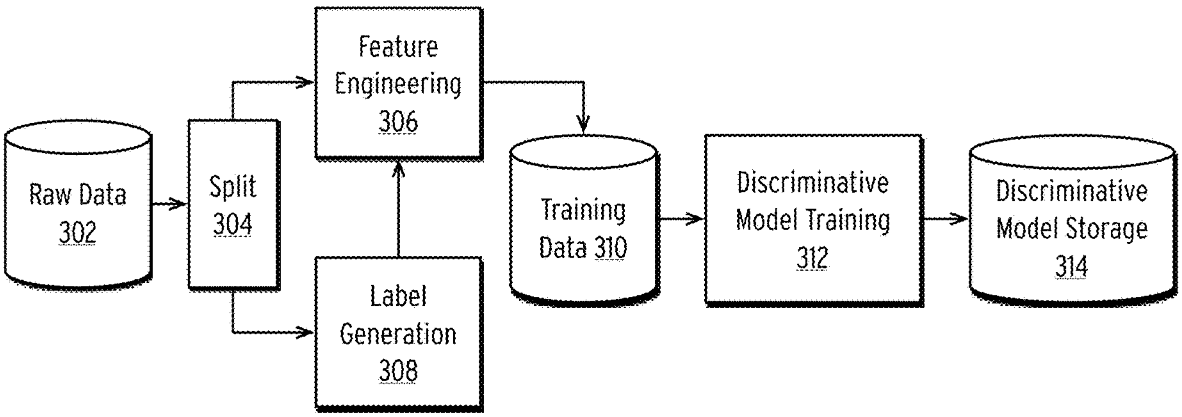
FIG. 3 is a block diagram illustrating a system for training a discriminative model according to some of the example embodiments.

FIG. 3 is a block diagram illustrating a system for training a discriminative model according to some of the example embodiments.

In the illustrated embodiment, a database 302 stores raw data. As discussed in FIG. 1, the raw data can comprise user data and interactions of users with objects in a system. As one example, the raw data can comprise transaction data of users in an e-commerce system. In such an example, the transaction data can comprise transactions associated with users, where each item of transaction data includes a transaction date, a transaction amount, product information, etc.

A split module 304 accesses the raw data in database 302 and segments the data into a training data set and holdout data set. In some embodiments, the split module 304 can split the data in database 302 based on a preconfigured split time, as discussed in FIG. 1. For example, the split module 304 can use all data occurring in the last month (from the current time) as holdout data while using the remaining data as training data. In the illustrated embodiment, the split module 304 can forward the training data to feature engineering phase 306 and forward the holdout data to label generation phase 308.

As illustrated, in an embodiment, a feature engineering phase 306 may receive the training data from split module 304 and pre-process the training data. In one embodiment, the feature engineering phase 306 can generate features much like calculation module 204. For example, the feature engineering phase 306 can generate RFM features for each user and combine a user identifier with the RFM features as an example for training or testing. Other pre-processing can be performed on the raw data and the use of RFM values is not intended to be limiting. Thus, in an embodiment, the feature engineering phase 306 can first generate unlabeled, per-user training vectors.

A label generation phase 308 receives the holdout data from split module 304 and generates labels for all unique users. In an embodiment, the label generation phase 308 can aggregate values for users, generating per-user aggregate values. For example, label generation phase 308 can compute a sum of all order amounts for all orders associated with a user in the holdout data. Other types of labels can be generated. In the illustrated embodiment, the label generation phase 308 provides the tuples (user identifier, label) back to the feature engineering phase 306 to generate a training data set.

Specifically, feature engineering phase 306 can annotate each unlabeled training vector with a corresponding label provided by label generation phase 308. In some embodiments, a user associated with a given training vector may not be associated with a label generated by label generation phase 308. In such an embodiment, the user did not record any interactions during the holdout period. In such a scenario, the feature engineering phase 306 can either drop the training vector not associated with a label or may label the training vector with a default label (e.g., zero or null).

After labeling all training vectors, the feature engineering phase 306 writes the labeled training vectors to database 310 for ingestion during training and/or validation. In some embodiments, the data in database 310 can be split into training, test, and validation sets. In the illustrated embodiment, a discriminative model training process 312 can be performed using the training data stored in database 310. In an embodiment, the discriminative model training process 312 can train any discriminative model such as a linear regression model, random forest, deep learning network, etc. and the specific details of training such models are not intended to be limiting.

After training, the discriminative model training process 312 writes the trained parameters to database 314. In one embodiment, the database 314 can comprise a relational database, file system (e.g., grid filesystem), or another type of storage mechanism. The specific type of storage mechanism used is not intended to be limiting.

Figure 4:
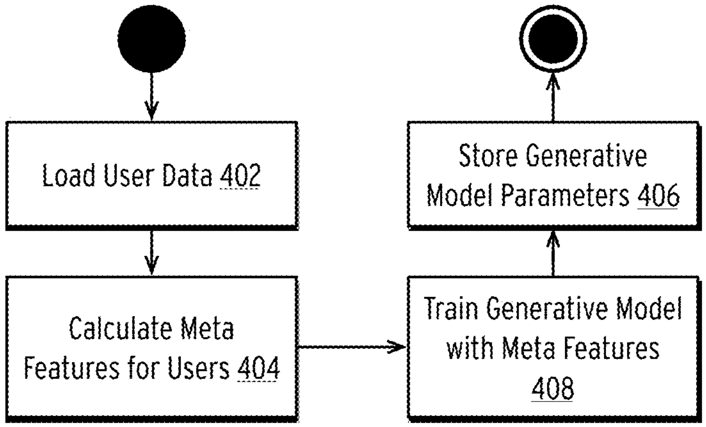
FIG. 4 is a flow diagram illustrating a method for training a generative model according to some of the example embodiments.

FIG. 4 is a flow diagram illustrating a method for training a generative model according to some of the example embodiments.

In step 402, the method can include loading user data. As discussed in FIGS. 1 and 2, the raw data can comprise user data and interactions of users with objects in a system. As one example, the raw data can comprise transaction data of users in an e-commerce system. In such an example, the transaction data can comprise transactions associated with users, where each item of transaction data includes a transaction date, a transaction amount, product information, etc.

In step 404, the method can include calculating features of the raw user data. In some embodiments, the method can include calculating RFM values for each user. In some embodiments, each of the RFM values can be calculated for a preset period (e.g., the last year). In some embodiments, the RFM values can include additional features such as a time value which represents the time between the first interaction and the end of a preset period. Although RFM values are discussed, any type of feature can be computed in step 404.

In step 406, the method can include training a generative model with predefined features. In an embodiment, the generative model can comprise any statistical model of a joint probability distribution reflecting a user lifetime value. In an embodiment, the generative model can comprise a Pareto/NBD model. In some embodiments, the generative model can further include a gamma-gamma model or extension to a Pareto/NBD model. Other models, such as a BG/NBD, may be used. In some embodiments, existing libraries can be used to fit a generative model using the data (e.g., RFM data) and the details of fitting a generative model are not recited in detail herein.

In step 408, the method can include storing the model parameters to a storage device. In some embodiments, the storage device can comprise a database, while other formats (e.g., flat files, in-memory) can be used. In some embodiments, the method can include outputting a small number of parameters (e.g., seven parameters for a Pareto/NBD model with a gamma-gamma extension) and thus the method can include writing these parameters to a flat file or another non-relational storage device. In some embodiments, the method can execute entirely or partially in memory and the model parameters can be calculated on demand for downstream usage.

Figure 5:
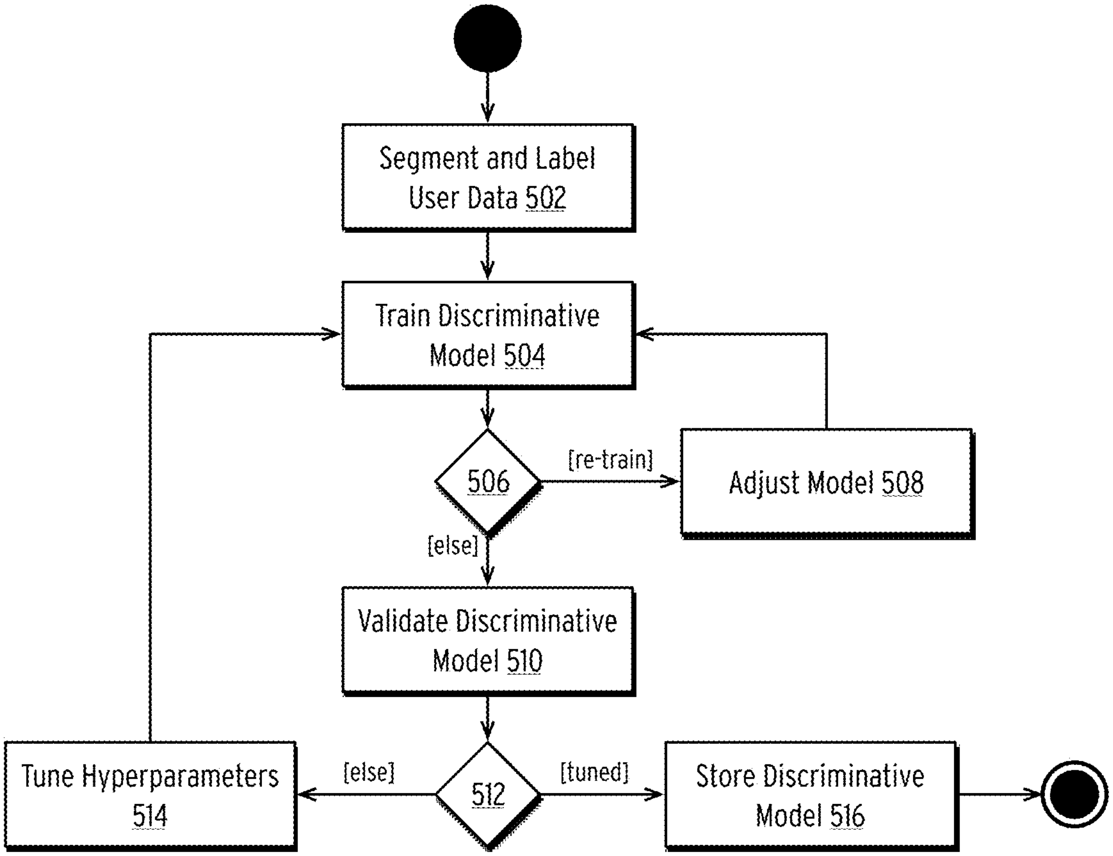
FIG. 5 is a flow diagram illustrating a method for training a discriminative model according to some of the example embodiments.

FIG. 5 is a flow diagram illustrating a method for training a discriminative model according to some of the example embodiments.

In step 502, the method can include segmenting and labeling user data. In an embodiment, the method can access a data set of interactions of users. The method can then split the data set based on a preconfigured holdout time. In an embodiment, the preconfigured holdout time can comprise the last one month of interactions. The method can then compute labels for the interactions occurring prior to the holdout time based on the data in the holdout period. For example, for each unique user associated with interactions occurring prior to the holdout time, the method can aggregate a total number of interactions (or total amount spent) using the interactions in the holdout period and use that aggregate as a label for training and testing. The resulting labeled data can be used as a training and test data set. In some embodiments, the method can then split the labeled data into separate training and test data sets.

In step 504, the method can include training a discriminative model. Various discriminative models can be used in the method and the method is not limited to a specific discriminative model. The specific training methodology used may vary depending on the discriminative model used and thus is not limiting. For example, backpropagation can be used in a neural network while bagging can be used for a random forest model.

In step 506, the method can include determining if re-training is needed. In any discriminative model, the method can compute the accuracy of the model after adjusting the parameters of the model (e.g., number of trees, network weights, etc.). For example, a confusion matrix can be used to evaluate the accuracy of the currently trained random forest model while a loss function can be used to evaluate the accuracy of a neural network.

In step 508, if re-training is needed, the method can include adjusting the model properties of the discriminative model. In some embodiments, step 508 can comprise adjusting weights based on gradients of a cost function in a neural network or adjusting the number of trees or the depth of trees in a random forest.

In step 510, when the method determines that the discriminative model is trained, the method can include validating the discriminative model. In some embodiments, the method can determine that a model is trained when a given error rate is below a desired threshold. For example, in a random forest model, the method can determine that the model is trained when the average tree prediction (or majority vote prediction) for an out-of-sample prediction set is within a preset distance from the expected (i.e., labeled) prediction set. Similarly, for a neural network the method can determine if the prediction error for training data is less than a desired error rate.

In step 512, the method can include determining if the discriminative model is tuned. In one embodiment, the method can determine if a discriminative model is tuned by generating predictions for the test set generated in step 502 and comparing the generated predictions to the expected predictions. The resulting validation error rate can be used to determine if the accuracy of the model meets the desired accuracy. In other embodiments, a cross-validation strategy can be used.

In step 514, if the method determines that the discriminative model is not tuned properly, the method can tune hyperparameters of the discriminative model and re-train the model, re-executing step 504, step 506, step 508, step 510, and step 512 until the discriminative model is tuned. The specific hyperparameters may vary depending on the model. For example, the number of trees in a random forest can be used as the hyperparameter while the number of hidden units can be adjusted in a neural network.

In step 516, if the method determines that the model is tuned, the method can include storing the discriminative model. In some embodiments, the method stores the model parameters fitted in step 508 in a database, flat file, or similar storage medium.

Figure 6:
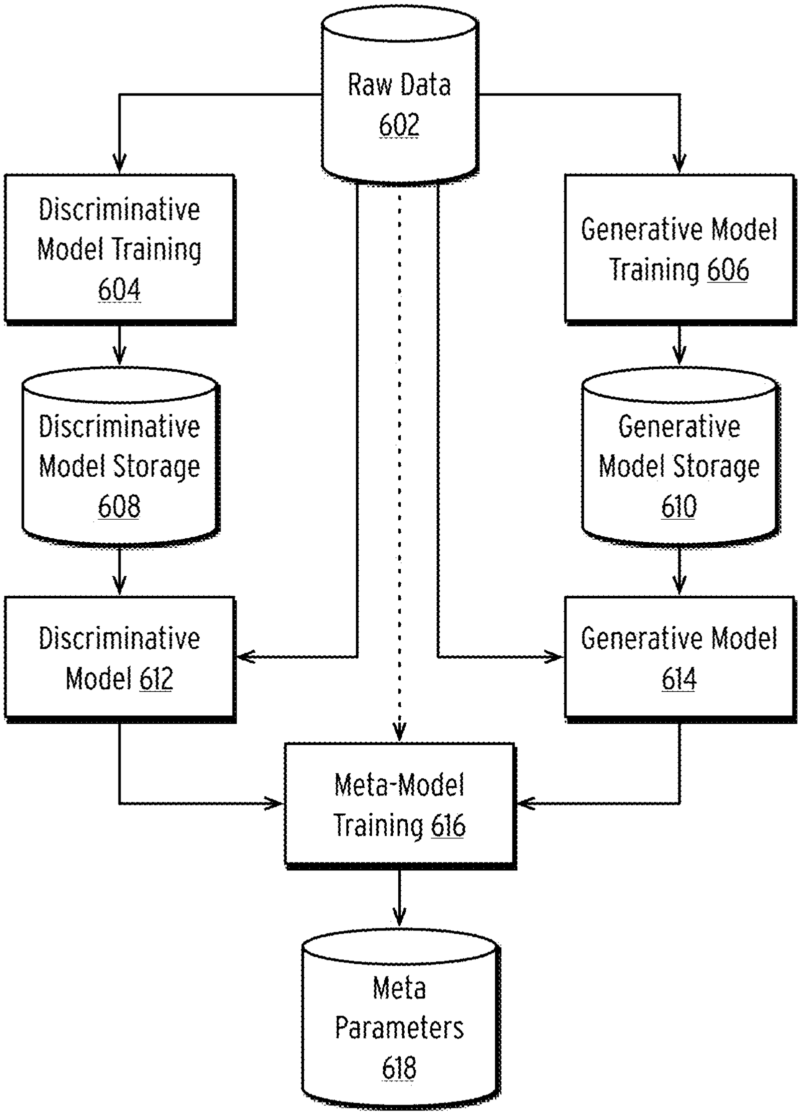
FIG. 6 is a block diagram illustrating a system for training a meta-model for predicting user lifetime value according to some of the example embodiments.

FIG. 6 is a block diagram illustrating a system for training a meta-model for predicting user lifetime value according to some of the example embodiments.

In the illustrated embodiment, the system includes database 602 stores raw data. As discussed in FIG. 1, the raw data can comprise user data and interactions of users with objects in a system. As one example, the raw data can comprise transaction data of users in an e-commerce system. In such an example, the transaction data can comprise transactions associated with users, where each item of transaction data includes a transaction date, a transaction amount, product information, etc.

The system includes a discriminative model training stage 604 and a generative model training stage 606 that accesses the database 602 and trains a discriminative and generative model, respectively. Details of these stages are provided in FIGS. 2 and 4 (for generative models) and FIGS. 3 and 5 (for discriminative models), respectively and are not repeated herein.

After fitting in the generative model training stage 606, the generative model training stage 606 outputs the model parameters to a database 608. In some embodiments, the database 608 can comprise a database, while other formats (e.g., flat files, in-memory) can be used. In some embodiments, the generative model training stage 606 outputs a small number of parameters (e.g., seven parameters for a Pareto/NBD model with a gamma-gamma extension) and thus the generative model training stage 606 can write these parameters to a flat file or another non-relational storage device. In some embodiments, the system can execute entirely or partially in memory and the model parameters can be calculated on demand for downstream usage. After training the discriminative model, the discriminative model training stage 604 writes the trained parameters to database 610. In one embodiment, the database 610 can comprise a relational database, file system (e.g., grid filesystem), or another type of storage mechanism. The specific type of storage mechanism used is not intended to be limiting.

In the illustrated embodiment, the discriminative model training stage 604 and a generative model training stage 606 can be executed in advanced, to store the respective models in database 608 and database 610, respectively. In some embodiments, the discriminative model training stage 604 and a generative model training stage 606 can be executed in sequence with the following training of the meta-model.

To train the model, the generative model 612 and discriminative model 614 are loaded from database 608 and database 610, respectively. The models are then provided to a meta-model training phase 616 for training an ensemble meta-model. In brief, the meta-model is trained by inputting raw data from database 602 into both generative model 612 and discriminative model 614 and using the predicted outputs as input features. In some embodiments, the meta-model training phase 616 can be configured to generate weights for the predictions of the generative model 612 and discriminative model 614. For example, the meta-model training phase 616 can train a linear or logistic regression model using the predictions from generative model 612 and discriminative model 614 as explanatory variables. In other embodiments, the meta-model training phase 616 can be trained to further predict a meta-feature function for each prediction which takes, as an input, a given feature vector, and computes a weight to apply in addition to a static coefficient of, for example, a linear or logistic regression function. Further detail on training of the meta-model is provided in FIG. 8 and not repeated herein.

After the meta-model is trained, the trained parameters (e.g., static parameters and/or meta-feature functions in matrix form) are persisted to a database 618 of meta-model parameters. In some embodiments, the database 618 can comprise one or more databases such as relational databases, NoSQL databases, or other storage media. During a prediction phase (discussed next), a system can load the models from database 608, database 610 and database 618 and predict a user lifetime value using each model.

In the illustrated embodiment, the meta-model training phase 616 is configured to load a set of features from database 602 as initial training data. The initial training data is fed to database 608 and database 610 to generate a generative prediction ($p_G(x)$) for a given input feature x and a discriminative prediction ($p_D(x)$) for the same input feature x. As discussed above, a given feature x is associated with a predicted value y, however the values of $p_G(x)$ and $p_D(x)$ may not equal y, by nature of the generative model 612 and discriminative model 614, respectively. In some embodiments, the values of $p_G(x)$ and $p_D(x)$ can comprise continuous values (e.g., floating point representations).

In some embodiments, the meta-model train phase 616 can train a linear model, such as a linear regression model. In such a scenario, the meta-model can predict linear coefficients of the linear regression equation. Specifically, the meta-model can comprise a linear function:

$$Y(x)=\omega_G p_G(x)+\omega_D p_D(x) \qquad \text{Equation 1}$$

In Equation 1, $\omega_i$ represents a scalar weight for a predictive model i. Although only two models ($p_G(x)$ and $p_D(x)$) are illustrated any number of models can be used and any combination of model types (generative or discriminative) can be used. Thus, the linear meta-model can be represented more generally, for a number of predictive models i, as:

$$y(x) = \sum_i \omega_i p_i(x) \qquad \text{Equation 2}$$

In another embodiment, the meta-model can comprise a linear model that utilizes feature weighting to fine-tune predictions based on features of the input data. For example, the meta-model can comprise a weighted feature linear stacking meta-model. In such a scenario, Equation 2 can be modified as:

$$y(x) = \left(W\bar{f}\right)^T\bar{P} = \sum_{i,j} \omega_{i,j} f_j(x) p_i(x) \qquad \text{Equation 3}$$

In Equation 3, W represents a learned weight matrix trained during the meta-model training phase 616 used to select a function from a function matrix ($\bar{f}$) to apply to the predictions ($\bar{P}$) of the various initial models. In some embodiments, the function matrix $\bar{f}$ can comprise a n-dimensional vector, where n represents the number of functional features while W comprises an n×m matrix, where n represents the number of base models and m represents the number of meta features. For example, in a system with two base models and five meta features, the matrix W may comprise a 2×5 matrix. In some embodiments, the form of $\bar{f}$ can be manually specified to include a number of functions on the input feature fields.

As illustrated additionally in Equation 3, the prediction function of the meta-model can alternatively be expressed as a double summation over j functional relations and i predictions whereby each prediction ($p_i(x)$) for a dependent variable x is weighted both by all feature values $f_j(x)$ and a learned weight for both the prediction type and the functional mapping. In some embodiments, the weight matrix W can be configured an identity matrix, which simplifies Equation 3 to:

$$y(x) = \sum_i f_i(x) p_i(x) \qquad \text{Equation 4}$$

As an example of the foregoing, two functions can be implemented in a 1×2 functional matrix $\bar{f}$:

$$\bar{f}=(\text{bool}(\text{order}_{freq}>0),\text{bool}(\text{order}_{freq}==0)) \qquad \text{Equation 5}$$

In Equation 5, bool represents a step function that outputs one or zero depending on whether the conditional argument is true or false. The $\text{order}_{freq}$ parameter can comprise a value in the raw input data that represents an order frequency computed for a given user. During training, the meta-model training phase 616 will predict the members of the weight matrix W that corresponding determines the impacts of each function in $\bar{f}$ as applied to each prediction (e.g., to a Pareto/NBD or random forest prediction).

Training during the meta-model training phase 616 can be performed iteratively until a desired accuracy threshold is met (as discussed in FIG. 8) and a target validation accuracy is met. Once met, the meta-model training phase 616 can persist the coefficients or weight matrix to database 618 for use in prediction, discussed next.

Figure 7:
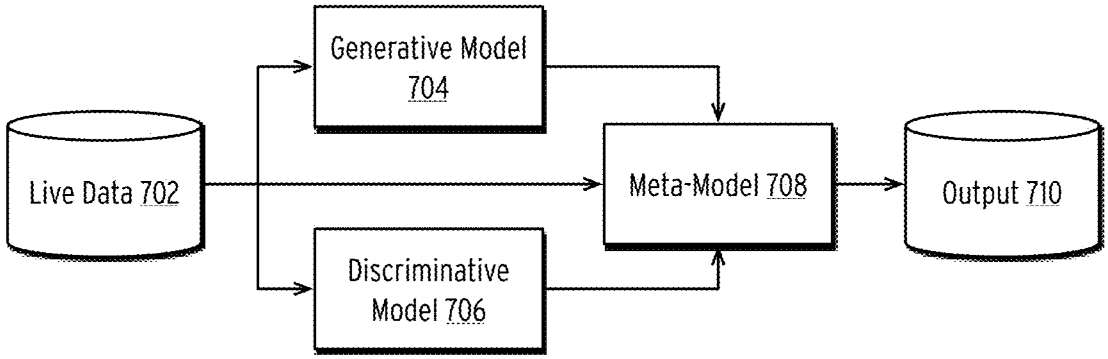
FIG. 7 is a block diagram illustrating a system for predicting user lifetime value using a meta-model according to some of the example embodiments.

FIG. 7 is a block diagram illustrating a system for predicting user lifetime value using a meta-model according to some of the example embodiments.

In the illustrated embodiment, a database 702 of live data provides data to a generative model 704, a discriminative model 706, and a meta-model 708. The meta-model 708 blends the outputs of the generative model 704 and discriminative model 706 and, in some embodiments, weights the outputs of the generative model 704 and discriminative model 706 using live data from the database 702 of live data. The resulting predictions can then be persisted to an output dataset 710.

In the illustrated embodiment, the database 702 of live data comprises interactions of users during a given time period. For example, the database 702 of live data can accumulate recorded interactions on a periodic basis (e.g., every month) and the system can execute on a monthly basis to predict a customer value for a forecasting period (e.g., the next month). In some embodiments, the database 702 of live data can be pre-processed to generate feature vectors for each user. For example, RFM values for each user can be computed as discussed above.

In the illustrated embodiment, for a given input feature x the system generates a plurality of predictions p based on two or more predictive models such as generative model 704 and discriminative model 706. As discussed in connection with FIGS. 2 through 6, these models can be configured to predict a customer's lifetime value (or similar metric) using the input feature x. In some embodiments, the outputs of the generative model 704 and discriminative model 706 are the same, comprising a continuous value. For example, both generative model 704 and discriminative model 706 can predict the value (in currency) of a given user represented by input features x in a given forecast period. The output of generative model 704 is represented as $P_G(x)$ and the output of discriminative model 706 is represented as $p_D(x)$, as used in previous equations As illustrated, the meta-model 708 receives both the predictive outputs of the models (e.g., generative model 704 and discriminative model 706) as well as the input features used during the prediction phase of generative model 704 and discriminative model 706. As discussed in FIG. 6, the meta-model 708 is represented by a weight matrix. In some embodiments, during prediction the meta-model 708 first computes the functional values for each input using a listing of functional features. The meta-model 708 can then multiply the function values by the weight matrix to obtain weighting coefficients to apply to each prediction. as represented in Equation 3.

As a result, the meta-model 708 can sum these multiplications to obtain a final prediction. Thus, the method can weight the predictive outputs of generative model 704 and discriminative model 706 both on their overall accuracy but also on their accuracy for given input features. Thus, if discriminative model 706 is biased against a particular feature condition (E.g., $order_{freq}>0$ as illustrated in Equation 5), the weight matrix can increase a weighting to the generative model (in the event it more accurately predicts on such input features).

As discussed in FIG. 6, in some embodiments, a weight matrix can be optional and instead the meta-model 708 can utilize static coefficients to weight the outputs of generative model 704 and discriminative model 706 using, for example, a linear function $y(x)=\omega_G p_G(x)+\omega_D p_D(x)$ as previously discussed. Thus, in some embodiments, the weight matrix and feature-weighting may be optional.

Figure 8:
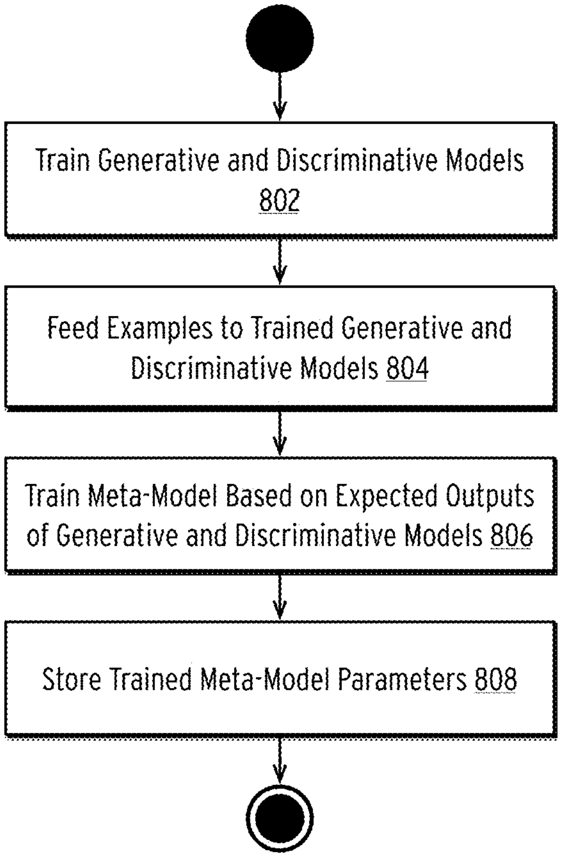
FIG. 8 is a flow diagram illustrating a method for training a meta-model for predicting user lifetime value according to some of the example embodiments.

FIG. 8 is a flow diagram illustrating a method for training a meta-model for predicting user lifetime value according to some of the example embodiments.

In step 802, the method can include training generative and discriminative models. In some embodiments, the method can use the methods described in connection with FIGS. 4 and 5 to train the generative and discriminative models, respectively. In one embodiment, the method can train one generative and one discriminative model. In one embodiment, the generative model can comprise a Pareto/NBD (in some embodiments, with a gamma-gamma extension), and the discriminative model can comprise a random forest. The specific types of models are not limiting. Further, while the example embodiments describe the use of two models (one generative and one discriminative), the method can utilize an arbitrary number of generative and discriminative models. Indeed, in some embodiments, the method can use only multiple generative models or multiple discriminative models.

In step 804, the method can include feeding examples into the generative and discriminative models. In some embodiments, the examples can comprise examples extracted from raw data. For example, in some embodiments, the method can re-use the training data and labels used to train the generative and discriminative models as examples in step 804. Details of generating labeled examples from raw data are provided in the description of FIG. 3 which is not repeated herein.

In other embodiments, alternative approaches can be used to feed examples into the generative and discriminative models. Specifically, in some embodiments, re-using training data that was used to train the discriminative model can overfit the meta-model trained in FIG. 8. Thus, in some embodiments, the method can utilize a k-folds cross-validation strategy to generate training folds of data for both the generative and discriminative models (i.e., layer 1) and the meta-model (i.e., layer 2). In such a strategy, a single fold may be used to train the meta-model while k−1 folds may be used to train the generative and discriminative models. Other permutations may be used. Additionally, in some embodiments, one or more folds of training data can be used as testing data.

In step 806, the method can comprise training a meta-model using the outputs of the generative and discriminative models and an expected prediction. As discussed above, the expected predictions can be identified as part of a k-folds cross-validation strategy or other technique. In contrast to the generative and discriminative models, the input to the meta-model comprises predicted outputs of the generative and discriminative models and not meta-features such as RFM values or other input data. In the illustrated embodiment, the input to the generative and discriminative models comprises the meta-features and these meta-features are associated with an expected output. Thus, the method re-uses the expected label but converts the training vector to comprise the predictions of the generative and discriminative models and the expected value.

As discussed above, the meta-model can comprise various types of models. In one embodiment, the meta-model can comprise a linear regression model. In other embodiments, a neural network can be used. In some embodiments, the meta-model can comprise training a linear function such as that discussed in connection with Equations 1 and 2, the description of which is not repeated herein in its entirety. In brief, the training of the meta-model can comprise calculating coefficients (and optional bias) or a feature weight matrix to use during predictions. In some embodiments, the number of coefficients is equal to the number of predictive models used in step 804. In some embodiments, the weight matrix may be sized based on the number of feature weighting functions and may comprise an n×m matrix, where n is the number of base models and m is the number of metafeatures. In some embodiments, step 806 can further include testing and validating the meta-model using a k-folds validation strategy.

In step 808, the method can include storing the trained meta-model parameters. As discussed, the meta-model parameters can comprise a set of coefficients (and optional bias) or a weight matrix. In some embodiments, the functional features associated with the weight matrix can be similarly stored as model parameters. In some embodiments, the meta-model parameters can be stored in a relational database, flat file, or another type of persistent storage for use during the prediction phase, discussed in FIG. 9.

Figure 9:
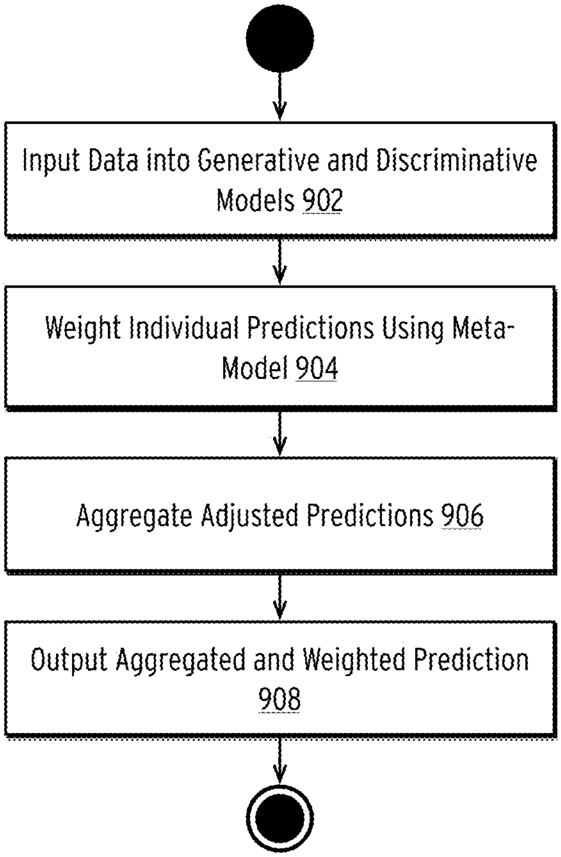
FIG. 9 is a flow diagram illustrating a method for predicting user lifetime value using a meta-model according to some of the example embodiments.

FIG. 9 is a flow diagram illustrating a method for predicting user lifetime value using a meta-model according to some of the example embodiments.

In step 902, the method can include inputting live data into two or more predictive models such as a generative model and a discriminative model. As discussed, although the embodiments generally describe two models, one generative and one discriminative, the disclosure is not limited as such an indeed multiple of such models may be used. As described, in some embodiments, the live data can comprise an aggregated user vector generated based on a preconfigured duration of recorded interactions. In response, the predictive models output two or more corresponding predictions. These predictions can comprise continuous values such as a user lifetime value for a given forecasting period.

In step 904, the method can include weighting the individual predictions using meta-model parameters. In some embodiments, these meta-model parameters can comprise weight coefficients and can be applied directly to the predictive outputs generated in step 902. In another embodiment, the meta-model parameters can comprise a weight matrix. In such a scenario, the input features are input into a plurality of functions, and the outputs of the functions are multiplied by the weight matrix to obtain a weight coefficient.

In step 906, the method can include aggregating the weighted predictions of each predictive model (e.g., generative and discriminative). In some embodiments, the model can sum the weighted predictions. In some embodiments, a predicted bias can be summed with the weighted predictions.

In step 908, the method can include outputting the weighted and aggregated predictions. As discussed, in some embodiments, the method can store the predicted outputs in a persistent data store. In some embodiments, the predicted output can be associated with a user associated with the input feature. In some embodiments, after a time period elapses, the method can compare the predicted output to the actual output and use the difference to fine-tune the model.

Figure 10:
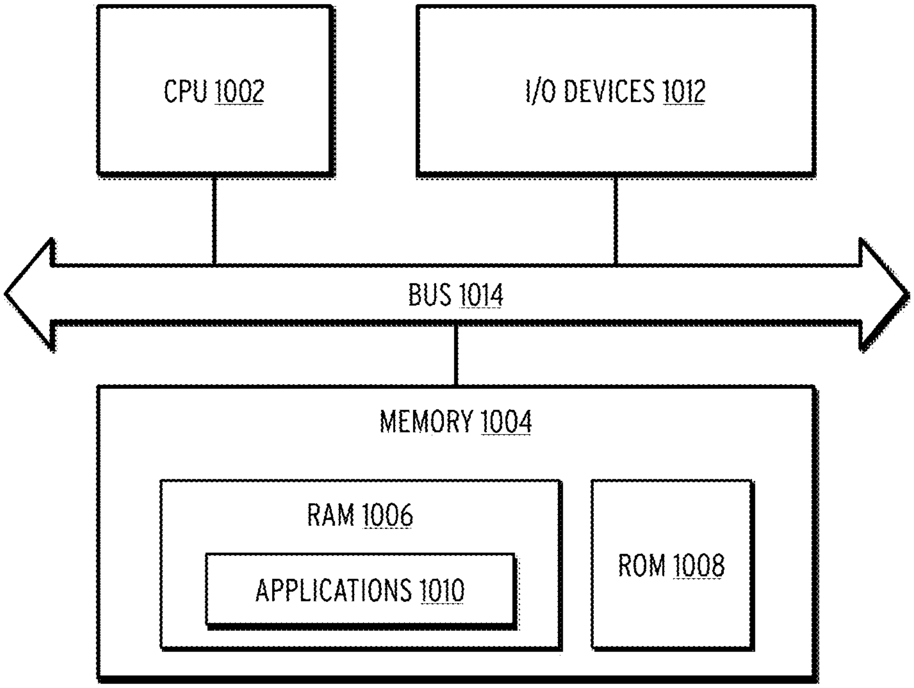
FIG. 10 is a block diagram of a computing device according to some embodiments of the disclosure.

FIG. 10 is a block diagram of a computing device according to some embodiments of the disclosure. In some embodiments, the computing device can be used to train and/or use the various ML models described previously.

As illustrated, the device includes a processor or central processing unit (CPU) such as CPU 1002 in communication with a memory 1004 via a bus 1014. The device also includes one or more input/output (I/O) or peripheral devices 1012. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 1002 may comprise a general-purpose CPU. The CPU 1002 may comprise a single-core or multiple-core CPU. The CPU 1002 may comprise a system-on-a-chip (SoC) or a similar embedded system. In some embodiments, a graphics processing unit (GPU) may be used in place of, or in combination with, a CPU 1002. Memory 1004 may comprise a memory system including a dynamic random-access memory (DRAM), static random-access memory (SRAM), Flash (e.g., NAND Flash), or combinations thereof. In an embodiment, the bus 1014 may comprise a Peripheral Component Interconnect Express (PCIe) bus. In some embodiments, bus 1014 may comprise multiple busses instead of a single bus.

Memory 1004 illustrates an example of computer storage media for the storage of information such as computer-readable instructions, data structures, program modules, or other data. Memory 1004 can store a basic input/output system (BIOS) in read-only memory (ROM), such as ROM 1008, for controlling the low-level operation of the device. The memory can also store an operating system in random-access memory (RAM) for controlling the operation of the device Applications 1010 may include computer-executable instructions which, when executed by the device, perform any of the methods (or portions of the methods) described previously in the description of the preceding Figures. In some embodiments, the software or programs implementing the method embodiments can be read from a hard disk drive (not illustrated) and temporarily stored in RAM 1006 by CPU 1002. CPU 1002 may then read the software or data from RAM 1006, process them, and store them in RAM 1006 again.

The device may optionally communicate with a base station (not shown) or directly with another computing device. One or more network interfaces in peripheral devices 1012 are sometimes referred to as a transceiver, transceiving device, or network interface card (NIC).

An audio interface in peripheral devices 1012 produces and receives audio signals such as the sound of a human voice. For example, an audio interface may be coupled to a speaker and microphone (not shown) to enable telecommunication with others or generate an audio acknowledgment for some action. Displays in peripheral devices 1012 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 1012 may comprise any input device arranged to receive input from a user. An illuminator in peripheral devices 1012 may provide a status indication or provide light. The device can also comprise an input/output interface in peripheral devices 1012 for communication with external devices, using communication technologies, such as USB, infrared, Bluetooth®, or the like. A haptic interface in peripheral devices 1012 provides tactile feedback to a user of the client device.

A GPS receiver in peripheral devices 1012 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In an embodiment, however, the device may communicate through other components, providing other information that may be employed to determine the physical location of the device, including, for example, a media access control (MAC) address, Internet Protocol (IP) address, or the like.

The device may include more or fewer components than those shown in FIG. 10, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein. Example embodiments are provided merely to be illustrative. Likewise, the reasonably broad scope for claimed or covered subject matter is intended. Among other things, for example, the subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment, and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms such as "and," "or," or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, can be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order. For example, two blocks shown in succession can, in fact, be executed substantially concurrently, or the blocks can sometimes be executed in the reverse order, depending upon the functionality/acts involved.

For the purposes of this disclosure, a non-transitory computer-readable medium (or computer-readable storage medium/media) stores computer data, which data can include computer program code (or computer-executable instructions) that is executable by a computer, in machine-readable form. By way of example, and not limitation, a computer-readable medium may comprise computer-readable storage media for tangible or fixed storage of data or communication media for transient interpretation of code-containing signals. Computer-readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, cloud storage, magnetic cassettes, magnetic tape, magnetic disk storage, or other magnetic storage devices, or any other physical or material medium which can be used to tangibly store the desired information or data or instructions and which can be accessed by a computer or processor.

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

We claim:

1. A system comprising:
at least one processor; and
memory storing instructions that, when executed by the at least one processor, implement:
a generative model, the generative model configured to generate a first prediction representing a first lifetime value of a user during a forecasting period using a joint probability distribution trained on a complete training dataset without requiring holdout data;
a discriminative model, the discriminative model configured to generate a second prediction representing a second lifetime value of the user during the forecasting period using a conditional probability distribution trained on a training dataset with holdout data for validation; and a meta-model trained using predictions from the generative model and predictions from the discriminative model as inputs and actual lifetime values as training labels to determine weight coefficients, the meta-model configured for receiving the first prediction and the second prediction and generating a third prediction based on the first prediction and the second prediction by applying the weight coefficients to the first prediction and the second prediction, the third prediction representing a third lifetime value of the user during the forecasting period, wherein the weight coefficients are determined based on complementary characteristics of the generative model utilizing all available training data and the discriminative model providing user-specific personalization.

2. The system of claim 1, wherein the generative model comprises a Pareto negative binomial distribution model.

3. The system of claim 2, wherein the generative model further comprises a gamma-gamma model.

4. The system of claim 1, wherein the discriminative model comprises a linear regression model.

5. The system of claim 1, wherein the discriminative model comprises a random forest model.

6. The system of claim 1, wherein the meta-model comprises a plurality of weighting coefficients or a weight matrix and a plurality of functions.

7. The system of claim 1, wherein generating the third prediction based on the first prediction and the second prediction comprises weighting the first prediction and the second prediction by a first weight and a second weight, respectively, to generate a first weighted prediction and a second weighted prediction.

8. The system of claim 7, wherein generating the third prediction based on the first prediction and the second prediction further comprises multiplying the first prediction by a weighted feature selected by the meta-model to generate a first weighted feature and multiplying the second weighted prediction by the feature selected by the meta-model to generate a second weighted feature.

9. The system of claim 8, wherein generating the third prediction based on the first prediction and the second prediction further comprises summing the first weighted feature and the second weighted feature to generate a sum and using the sum as the third prediction.

10. A method comprising:

generating, using a generative model, a first prediction representing a first lifetime value of a user during a forecasting period using a joint probability distribution trained on a complete training dataset without requiring holdout data;

generating, using a discriminative model, a second prediction representing a second lifetime value of the user during the forecasting period using a conditional probability distribution trained on a training dataset with holdout data for validation;

receiving, using a meta-model, the first prediction and the second prediction, the meta-model trained using predictions from the generative model and predictions from the discriminative model as inputs and actual lifetime values as training labels to determine weight coefficients; and generating, using the meta-model, a third prediction based on the first prediction and the second prediction by applying the weight coefficients to the first prediction and the second prediction, the third prediction representing a third lifetime value of the user during the forecasting period, wherein the weight coefficients are determined based on complementary characteristics of the generative model utilizing all available training data and the discriminative model providing user-specific personalization.

11. The method of claim 10, wherein the generative model comprises a Pareto negative binomial distribution model.

12. The method of claim 11, wherein the generative model further comprises a gamma-gamma model.

13. The method of claim 10, wherein the discriminative model comprises one or more of a linear regression model or a random forest model.

14. The method of claim 10, wherein the meta-model comprises a plurality of weighting coefficients or a weight matrix and a plurality of functions.

15. The method of claim 10, wherein generating the third prediction based on the first prediction and the second prediction comprises weighting the first prediction and the second prediction by a first weight and a second weight, respectively, to generate a first weighted prediction and a second weighted prediction.

16. The method of claim 15, wherein generating the third prediction based on the first prediction and the second prediction further comprises multiplying the first prediction by a weighted feature selected by the meta-model to generate a first weighted feature and multiplying the second weighted prediction by the feature selected by the meta-model to generate a second weighted feature.

17. The method of claim 16, wherein generating the third prediction based on the first prediction and the second prediction further comprises summing the first weighted feature and the second weighted feature to generate a sum and using the sum as the third prediction.

18. A non-transitory computer-readable storage medium for tangibly storing computer program instructions capable of being executed by a computer processor, the computer program instructions defining steps of:

generating, using a generative model, a first prediction representing a first lifetime value of a user during a forecasting period using a joint probability distribution trained on a complete training dataset without requiring holdout data;

generating, using a discriminative model, a second prediction representing a second lifetime value of the user during the forecasting period using a conditional probability distribution trained on a training dataset with holdout data for validation;

receiving, using a meta-model, the first prediction and the second prediction, the meta-model trained using predictions from the generative model and predictions from the discriminative model as inputs and actual lifetime values as training labels to determine weight coefficients; and generating, using the meta-model, a third prediction based on the first prediction and the second prediction by applying the weight coefficients to the first prediction and the second prediction, the third prediction representing a third lifetime value of the user during the forecasting period, wherein the weight coefficients are determined based on complementary characteristics of the generative model utilizing all available training data and the discriminative model providing user-specific personalization.

19. The non-transitory computer-readable storage medium of claim 18, wherein generating the third prediction based on the first prediction and the second prediction comprises weighting the first prediction and the second prediction by a first weight and a second weight, respectively, to generate a first weighted prediction and a second weighted prediction.

20. The non-transitory computer-readable storage medium of claim 19, wherein generating the third prediction based on the first prediction and the second prediction further comprises multiplying the first prediction by a weighted feature selected by the meta-model to generate a first weighted feature and multiplying the second weighted prediction by the feature selected by the meta-model to generate a second weighted feature.

* * * * *